April 12, 1927.

C. O. GUERNSEY 1,624,867

GEAR SHIFTING MECHANISM

Filed March 21, 1925　　7 Sheets-Sheet 4

Inventor.—
Charles O. Guernsey.
by his Attorneys.—
Howson & Howson

April 12, 1927.
C. O. GUERNSEY
1,624,867
GEAR SHIFTING MECHANISM
Filed March 21, 1925   7 Sheets-Sheet 5
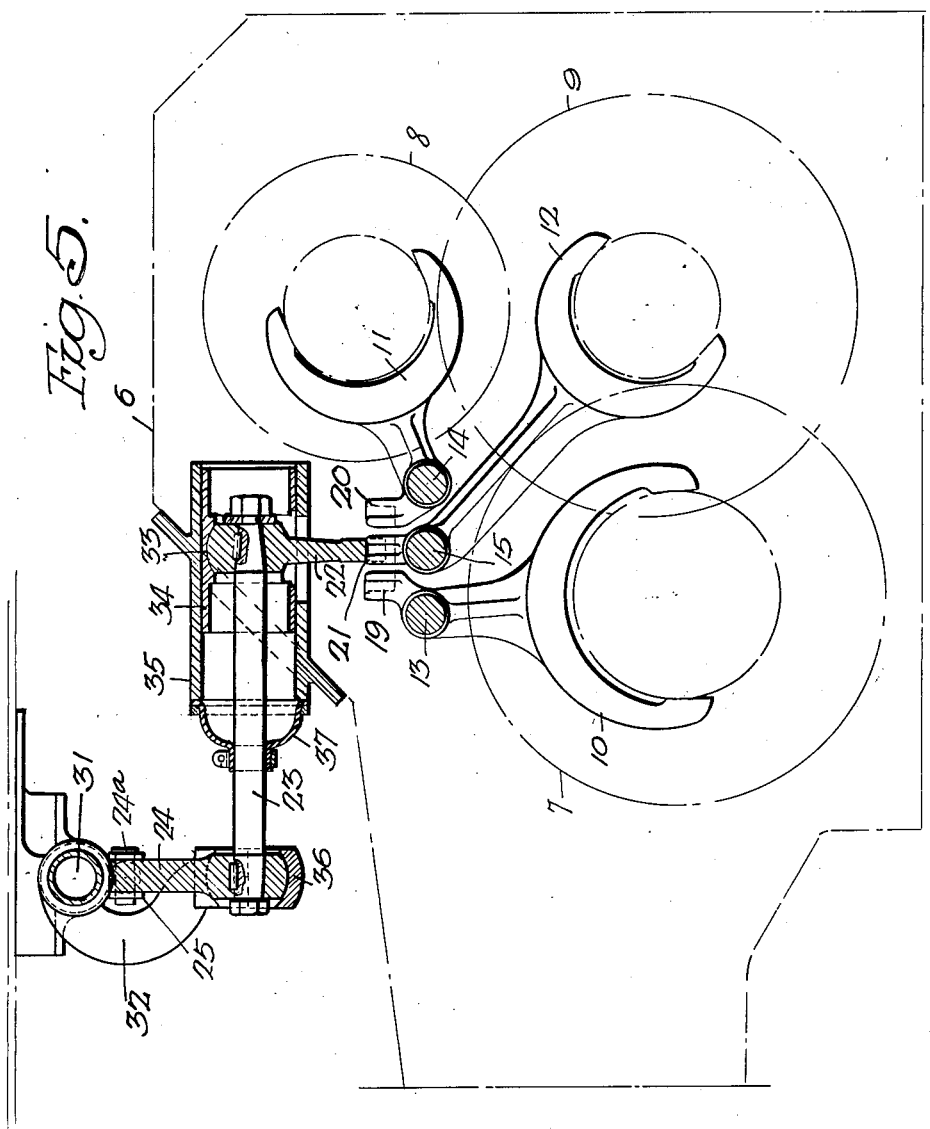
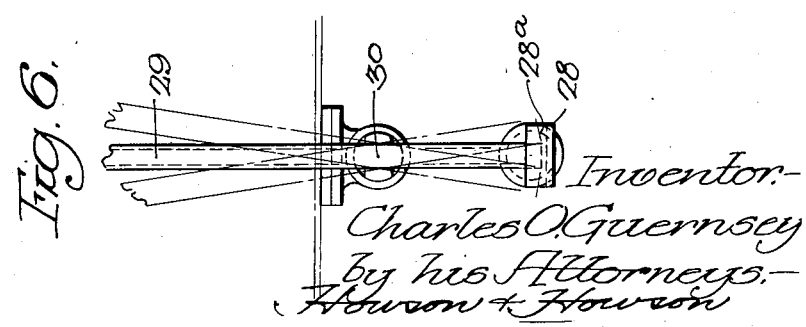
Inventor-
Charles O Guernsey
by his Attorneys,
Howson & Howson April 12, 1927.

C. O. GUERNSEY 1,624,867

GEAR SHIFTING MECHANISM

Filed March 21, 1925      7 Sheets-Sheet 6

Inventor.—
Charles O. Guernsey.
by his Attorneys.—
Howson & Howson

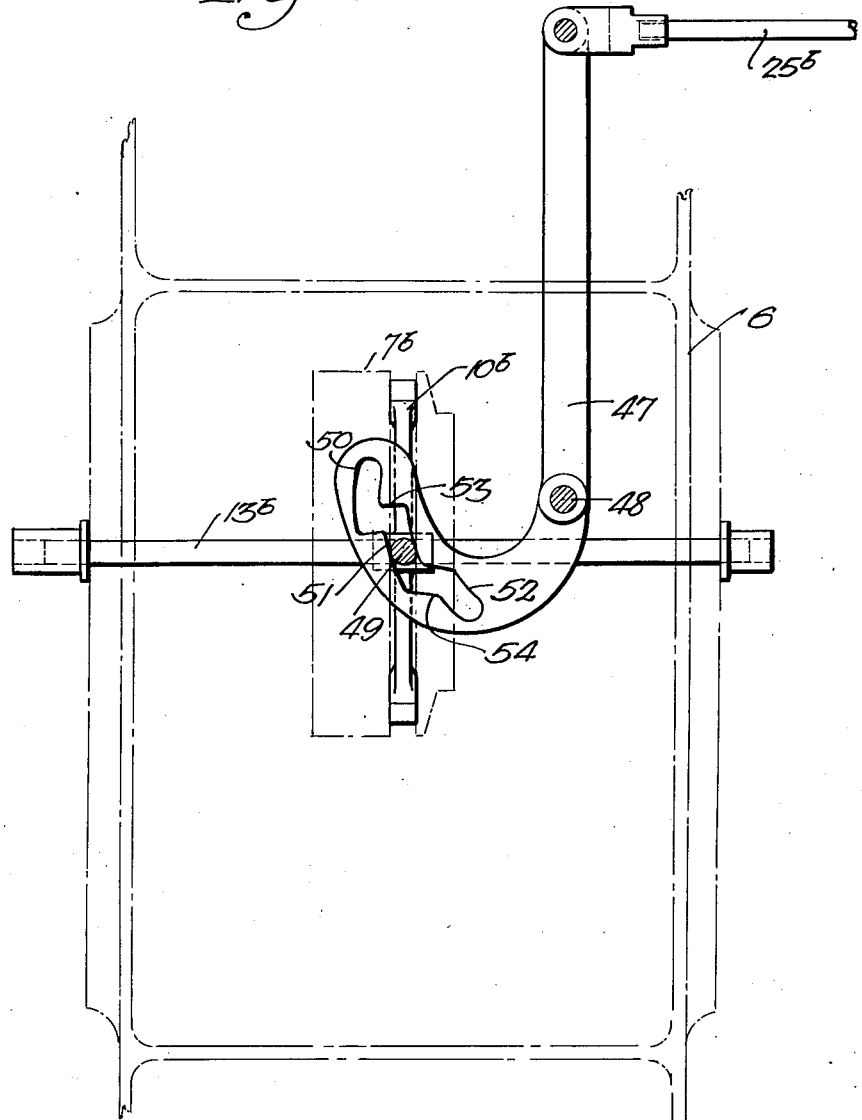

Patented Apr. 12, 1927.

1,624,867

UNITED STATES PATENT OFFICE.

CHARLES O. GUERNSEY, OF PHILADELPHIA, PENNSYLVANIA.

GEAR-SHIFTING MECHANISM.

Application filed March 21, 1925. Serial No. 17,213.

This invention relates to a gear shifting mechanism which is particularly applicable for use with gearing mounted on the truck of a railway coach as shown in my co-pending applications for power transmitting mechanism for railway coaches, Ser. No. 25,813, filed April 25, 1925, and for power transmitting gearing, Ser. No. 25,812, filed April 25, 1925. In a coach of this type the main frame carrying the operator's station is pivotally connected with the truck frame which carries the gearing.

The principal object of the invention is to provide a simple and reliable shifting mechanism which is within convenient reach of the operator and which is adapted to permit relative movements between the gearing on the truck of a car and the operator's station on the car body. Other objects of the invention will be apparent from the following specification and claims.

In the accompanying drawings I have illustrated several embodiments of the invention but it will be understood that the drawings are for illustrative purposes only and that further changes and substitutions may be made within the scope of the claims without departing from the spirit of the invention.

Of the drawings:

Fig. 5 is a vertical transverse view partly in section along the line 5—5 of Fig. 3.

Fig. 6 is a view taken from the front and showing the lower part of the operator's lever.

Fig. 8 is a view similar to Fig. 7 but showing still another alternate embodiment of the invention.

Figure 1:
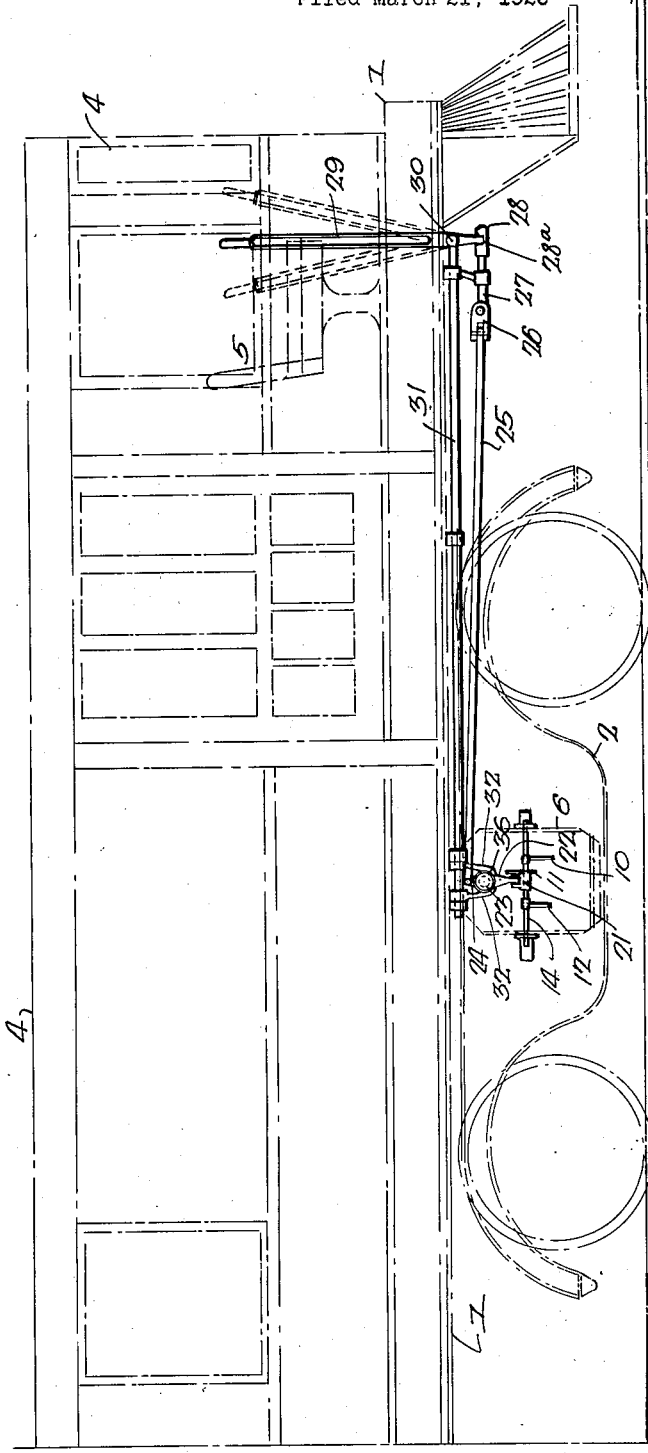
Fig. 1 is a side view showing a shifting mechanism embodying the invention applied to a self propelled railway coach.
Figure 2:
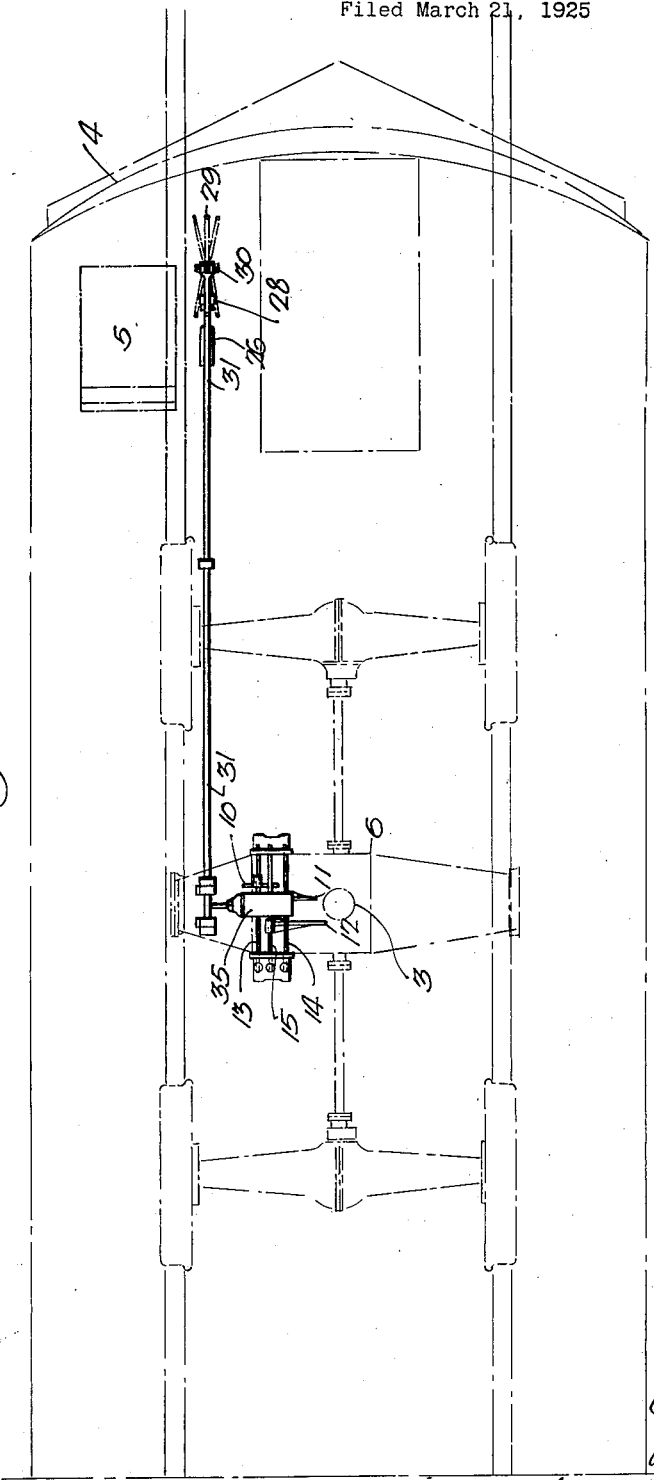
Fig. 2 is a plan view of the parts shown in Fig. 1.

Referring particularly to Figs. 1 and 2 of the drawings, 1 represents the main frame of a railway coach, this frame being carried in part by a truck 2 with which it has a suitable pivotal connection as indicated at 3. The coach body is represented at 4, this body being provided with an operator's station 5.

As fully described in my co-pending application for power transmitting mechanism for railway coaches, already referred to, the truck 2 carries speed changing gearing which is mounted in the truck bolster 6. As stated the truck has pivotal movement with relation to the car body, and in order to shift the gears in the truck bolster it is necessary to provide a suitable shifting mechanism which will permit this relative pivotal movement without in any way interfering with or interrupting the control of the gearing by the operator at the station 5 on the coach body.

Figure 3:
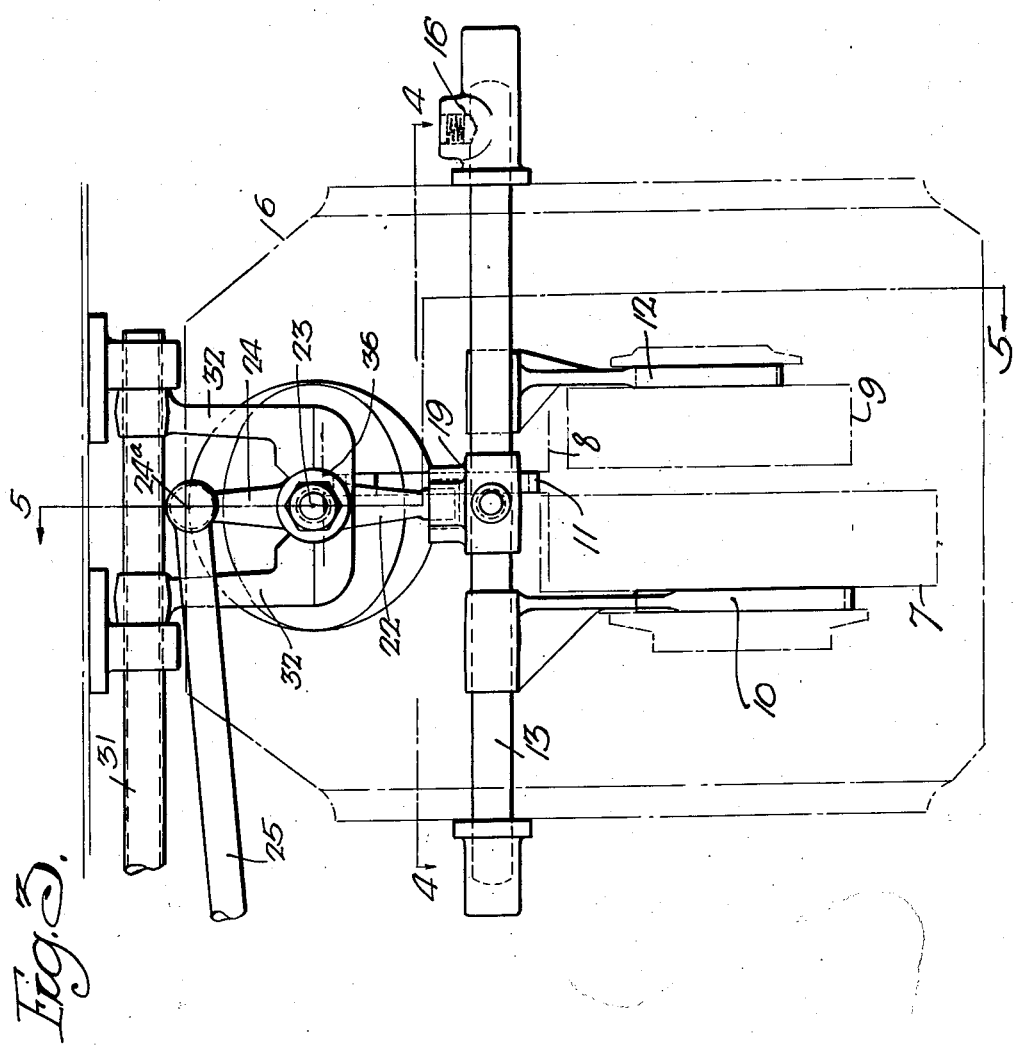
Fig. 3 is a side view on an enlarged scale of the rear part of the shifting mechanism.
Figure 4:
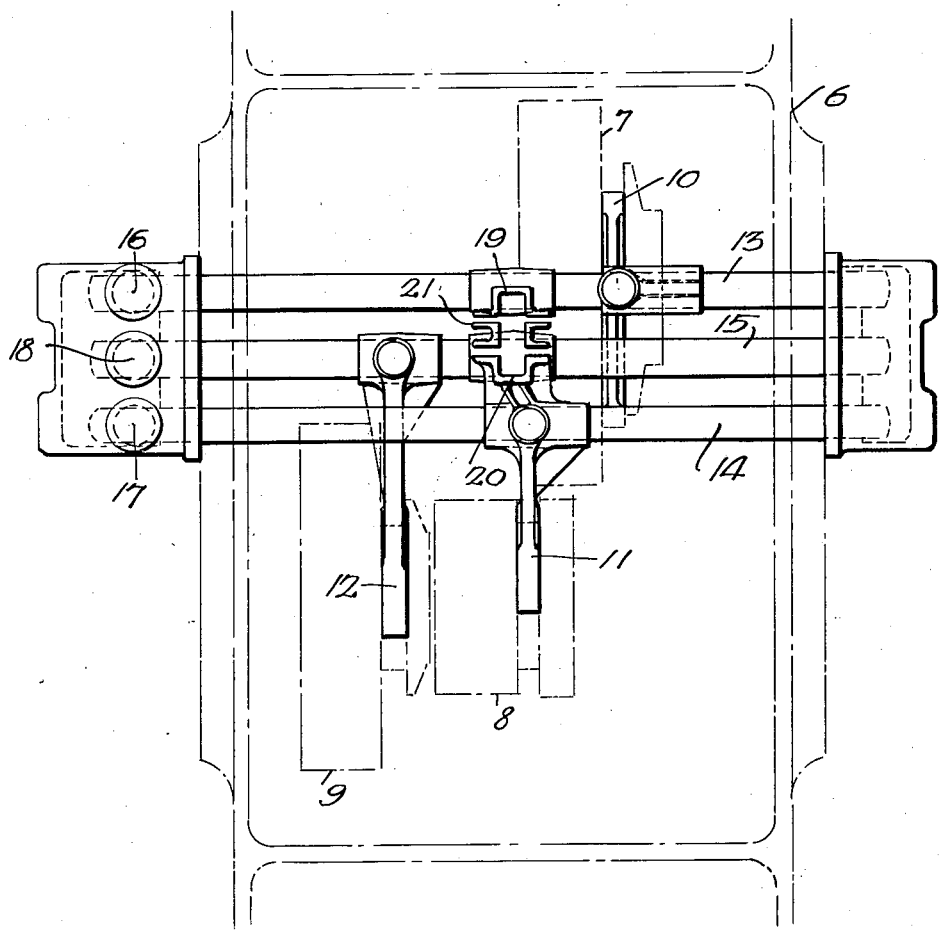
Fig. 4 is a plan view showing those parts of the shifting mechanism below the line 4—4 of Fig. 3.

Referring particularly to Figs. 3, 4 and 5, it will be seen that the gearing as illustrated includes three elements 7, 8 and 9 adapted to be shifted longitudinally, the construction of the gearing being such that it is necessary to move only one of these elements out of the central or neutral position at any one time. For moving the respective elements 7, 8 and 9, there are provided shifting forks 10, 11 and 12. These forks are mounted respectively on longitudinally slidable rods 13, 14 and 15. Automatic detents are provided respectively at 16, 17 and 18 for normally holding the corresponding rods in desired positions. The rods 13, 14 and 15 carry shifting devices in the form of lugs 19, 20 and 21 which are notched to receive a suitable actuating member. It will be clear that by moving the actuating member transversely it can be brought into engagement with the notch in any one of the lugs.

The actuating member for the lugs 19, 20 and 21 is in the form of an arm 22 secured to a shaft 23. The axis of the shaft extends transversely and is approximately radial with respect to the pivotal axis between the truck frame and the main frame. When there are two or more shifting devices or lugs, as shown, the shaft is axially movable to bring the arm 22 into the notch in any one of the lugs and the shaft is also movable angularly in order to rock the lever and thus move any one of the rods 13, 14 or 15 longitudinally as required.

The shaft 23 carries a second arm 24 which is pivotally connected at 24ª with a reach rod 25. This reach rod extends forward to a point underneath the operator's station where it is connected by means of a universal, joint 26 with a longitudinally slidable bar 27. This bar 27 has an enlargement 28 at its front end and in this enlargement is a transverse notch 28ª. An operator's lever 29 is so located as to be within convenient reach of the operator at the station 5, this lever being pivotally mounted at 30. The lower end of the lever 29 projects into the before-mentioned notch 28ª and it will be understood that when the lever is moved forward or backward the shaft 23 and the arm 22 are turned, thus moving one or another of the rods 13, 14 and 15 and shifting the corresponding gear member.

For moving the shaft 23 endwise, there is provided a longitudinally extending shaft 31 carried in bearings on the main frame of the coach. Near its rear end this shaft 31 has two depending levers 32, 32 which are connected with the shaft 23. The before-mentioned pivotal connection 30 for the lever 29 is at the front end of the shaft 31, the construction being such that when the lever 29 is rocked sidewise, as indicated in Fig. 6, the shaft 31 will be rocked correspondingly. This rocking or turning movement of the shaft 31 moves the shaft 23 endwise to bring the arm 22 into the notch in any one of the lugs 19, 20 or 21. It will be understood that the notch 28ª which has already been mentioned permits the lower end of the lever 29 to move transversely without in any way disturbing its engagement with the bar 27.

As stated at the outset, the truck 2 with the gearing thereon has pivotal movement with respect to the coach frame and coach body. In order to compensate for this pivotal movement, the shaft 23 instead of being mounted in rigid bearings is so mounted as to be universally adjustable, and preferably it is provided with ball and socket mountings at both ends. As shown most clearly in Fig. 5, the upper part of the arm 22 is formed with a spherical section 33 which engages a spherical surface in a slidable cylindrical bearing member 34. This bearing member 34 is slidable endwise in a housing 35 secured to the bolster 6. The lower end of the arm 24 is also formed with a spherical section 36 which fits spherical surfaces formed on the two levers 32, 32. The pivotal connection at 24ª is a relatively loose one, and the lower end of the arm 22 is so formed that it angularly adjusts itself with respect to whichever lug it may be engaged with. Preferably a boot 37 of leather or other flexible material is provided at the outer end of the housing 35 to exclude dust and dirt.

It will be seen that the two ball and socket constructions described permit the coach body to move with respect to the bolster of the truck within reasonable limits without in any way interfering with the action of the shifting mechanism. Any relative pivotal movement of the coach body about the vertical pivot axis will swing the outer end of the shaft 23 forward or backward with respect to the truck bolster. This movement, however, will simply swing the arm 22 about its central axis without in any way interfering with its engagement with the proper operating lug 19, 20 or 21.

Figure 7:
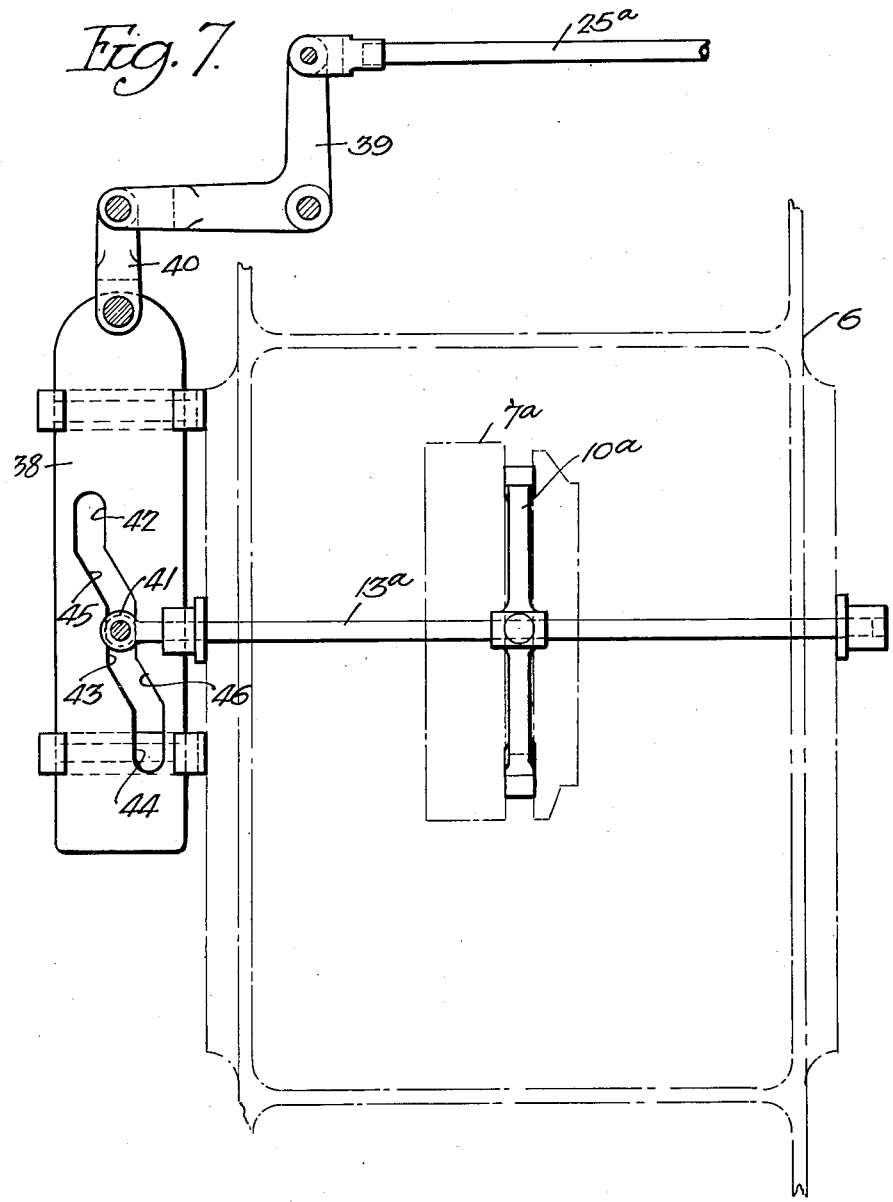
Fig. 7 is a diagrammatic plan view showing an alternate form of the invention arranged for shifting a single gear element.

In Fig. 7 I have shown an alternate construction adapted for shifting a single gear element, but it will be understood that a construction similar in principle can be used for shifting any one of several gear elements. As illustrated, a gear element is shown at 7ª, this being shiftable by means of a fork 10ª on a longitudinally movable rod 13ª. A transversely movable slide 38 is mounted on the bolster 6, this slide being operable from a reach rod 25ª by means of a bell-crank 39 and a link 40. The slide 38 has a slot therein which receives a roller 41 secured to the end of the rod 13ª. This slot has three sections 42, 43 and 44, which are parallel with the direction of movement of the slide and which correspond to the three operative positions of the gear element 7ª. These three slot sections are connected by two inclined or cam sections 45 and 46. It will be clear that by moving the slide 38 the rod 13ª and consequently the gear element 7ª can be moved to any one of the three operative positions.

Normally with the rod 13ª in one of its predetermined positions, the roller 41 is located about midway of the corresponding slot section 42, 43 or 44. It will be understood that the bell-crank 39 is pivotally connected with the casing of the gear mechanism and it is, therefore, obvious that when the car body moves pivotally with respect to the truck bolster there will be a corresponding movement of the bell-crank and of the slide 38. However, the straight sections of the slot are so designed as to permit this without causing any movement of the rod 13ª and the gear element 7ª.

Fig. 8 shows a construction similar in principle to that shown in Fig. 7. The shiftable gear element is indicated at 7ᵇ, the shifting fork at 10ᵇ and the longitudinally movable operating rod at 13ᵇ. A lever 47 is pivoted to the casing of the gear mechanism at 48 and at its outer end is pivotally connected directly with a reach rod 25ᵇ. Carried by the rod 13ᵇ is a pin 49 which projects into a slot in the lever 47. This slot is provided with three sections 50, 51 and 52 which are curved concentrically with the pivot of the lever. Inclined cam sections 53 and 54 serve to connect the concentric sections of the slot. It will be clear that by actuating the reach rod 25ᵇ and thereby swinging the lever 47 the operating rod 13ᵇ and the gear element 7ᵇ can be moved to any one of the three predetermined positions. At any one of the said positions the pin 49 is normally in the central part ot one of the slot sections 50, 51 or 52. Any relative pivotal movement of the car body with respect to the truck bolster will cause a slight pivotal movement of the lever 47. However, such a pivotal movement will merely cause the pin 49 to occupy a different part of the corresponding concentric section of the slot without moving the operating rod 13ᵇ and the gear element 7ᵇ.

What I claim is:

1. The combination with a frame and a gear mechanism connected together for relative pivotal movement; of a device movably mounted on the gear mechanism for shifting an element thereof; an operating lever on the frame; and a connecting mechanism between the operating lever and the said shifting device whereby the latter can be moved by the former, the said connecting mechanism including two universally adjustable devices which maintain an operative connection between the lever and the shifting device and which permit the gear mechanism and the shifting device to pivotally move as a unit relatively to the frame.

2. The combination with a frame and a gear mechanism connected together for relative pivotal movement; of a device movably mounted on the gear mechanism for shifting an element thereof; an operating lever on the frame; a shaft extending approximately radially with respect to the axis of the said pivotal movement; arms on the shaft; a universally adjustable connection between the lever and one arm on the shaft; and a universally adjustable connection between the other arm on the shaft and the shifting device.

3. The combination with a frame and a gear mechanism connected together for relative pivotal movement; of a device movably mounted on the gear mechanism for shifting an element thereof; an operating lever on the frame; a shaft extending approximately radially with respect to the axis of the said pivotal movement; universally adjustable bearings for the shaft mounted respectively on the gear mechanism and on the frame; arms on the shaft; a universally adjustable connection between the lever and one arm on the shaft; and a universally adjustable connection between the other arm on the shaft and the shifting device.

4. The combination with a frame and a gear mechanism connected together for relative pivotal movement, the gear mechanism comprising a plurality of elements adapted to be shifted; a plurality of shifting devices movably mounted on the gear mechanism and connected with the respective shiftable gear elements: an axially movable operating shaft mounted with its axis approximately perpendicular to the lines of movement of the shifting devices and also approximately radial with respect to the axis of the said pivotal movements; two supporting devices for the shaft mounted respectively on the gear mechanism and on the frame and permitting the shaft to accommodate itself to relative movements between the gear mechanism and the frame; an arm on the shaft adapted to operatively engage any one of the shifting devices; a second arm on the shaft; a link approximately perpendicular to the shaft and connected with the second arm to turn the shaft and thereby move one of the shifting members; a rock shaft approximately perpendicular to the said operating shaft; and a connection between the rock shaft and the operating shaft for moving the latter axially to engage the first said arm with any desired shifting device.

5. The combination with a frame and a gear mechanism connected together for relative pivotal movement, the gear mechanism comprising a plurality of elements adapted to be shifted; a plurality of shifting devices movably mounted on the gear mechanism and connected with the respective shiftable gear elements: an axially movable operating shaft mounted with its axis approximately perpendicular to the lines of movement of the shifting devices and also approximately radial with respect to the axis of the said pivotal movement; an arm on the shaft adapted to operatively engage any one of the shifting devices; a second arm on the shaft; a link approximately perpendicular to the shaft and connected with the second arm to turn the shaft and thereby move one of the shifting members; a rock shaft approximately perpendicular to the said operating shaft; an arm on the rock shaft for moving the latter axially to engage the first said arm with any desired shifting device; and two ball and socket supporting devices for the shaft; one slidably mounted on the gear mechanism and the other carried by the arm on the rock shaft.

6. The combination with a frame and a gear mechanism connected together for relative pivotal movement, the gear mechanism comprising a plurality of elements adapted to be shifted; a plurality of shifting devices movably mounted on the gear mechanism and connected with the respective shiftable gear elements: an axially movable operating shaft mounted with its axis approximately perpendicular to the lines of movement of the shifting devices and also approximately radial with respect to the axis of the said pivotal movement; an arm on the shaft adapted to operatively engage any one of the shifting devices; a second arm on the shaft; a link approximately perpendicular to the shaft and connected with the second arm to turn the shaft and thereby move one of the shifting members; a rock shaft approximately perpendicular to the said operating shaft; an arm on the rock shaft for moving the latter axially to engage the first said arm with any desired shifting device; a two ball and socket supporting device for one end of the shaft carried by the arm on the rock shaft; a second ball and socket supporting device for the other end of the shaft; and a cylindrical bearing member slidably mounted on the gear mechanism, the said bearing member surrounding and supporting the second ball and socket supporting device.

CHARLES O. GUERNSEY.